US006154792A

United States Patent [19]
Giordano et al.

[11] Patent Number: 6,154,792
[45] Date of Patent: Nov. 28, 2000

[54] METHOD AND COMPUTER PROGRAM PRODUCT FOR PAGING CONTROL USING A REFERENCE STRUCTURE INCLUDING A REFERENCE BITMAP

[75] Inventors: Thomas Paul Giordano; Barry Warren Knapp; Robert Paul Mech, all of Rochester; David Rolland Welsh, Byron, all of Minn.

[73] Assignee: International Business Machines Corporation, Armonk, N.Y.

[21] Appl. No.: 09/090,523

[22] Filed: Jun. 4, 1998

[51] Int. Cl.[7] ........................................... G06F 13/14
[52] U.S. Cl. ..................... 710/20; 710/29; 710/34; 710/58; 711/5; 711/137; 712/215; 712/216
[58] Field of Search ................... 710/29, 33, 58, 710/20, 34; 711/5, 137; 712/216, 215

[56] References Cited

U.S. PATENT DOCUMENTS

| | | | |
|---|---|---|---|
| 5,278,967 | 1/1994 | Curran | 711/5 |
| 5,408,658 | 4/1995 | Rechtschaffen et al. | 712/216 |
| 5,799,165 | 8/1998 | Favor et al. | 712/214 |
| 5,828,904 | 10/1998 | Batson et al. | 710/58 |

OTHER PUBLICATIONS

Long, Darrell, "Scheduling real–time disk transfers for continous media app.", IEEE, pp. 227–232, 1993.

Wang, R and A. Karmouch, "A Multimedia files Structure for Continuous and Discrete Media", IEEE, pp. 644–647, 1993.

*Primary Examiner*—Thomas C. Lee
*Assistant Examiner*—Tammara Peyton
*Attorney, Agent, or Firm*—Joan Pennington

[57] ABSTRACT

A method and computer program product are provided for paging control using a reference structure in a computer system. The reference structure is scanned to identify a next selected entry for an IO range building routine. The next selected entry is compared with a set hardlimit value. Responsive to the next selected entry being greater than the hardlimit value, the IO range building routine is exited. A shortlimit value is identified. The next selected entry is compared with the identified shortlimit value. Responsive to the next selected entry being greater than the identified shortlimit value, the IO range building routine is exited. A first array is used for storing entry IDs for selected entries found from scanning the reference structure and a second array is used for tracking blocks of storage used for the selected entries.

17 Claims, 13 Drawing Sheets

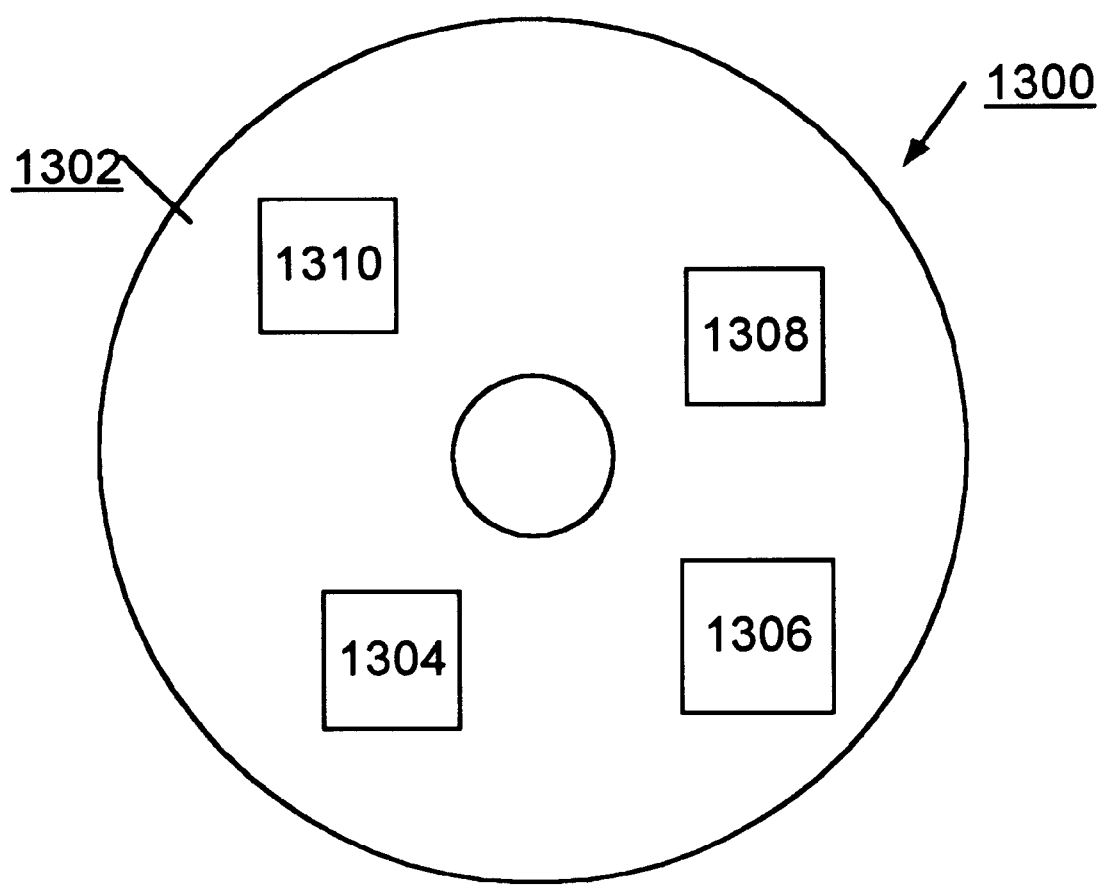

METHOD AND COMPUTER PROGRAM PRODUCT FOR PAGING CONTROL USING A REFERENCE STRUCTURE INCLUDING A REFERENCE BITMAP

FIELD OF THE INVENTION

The present invention relates to the data processing field, and more particularly, relates to a method and computer program product for paging control using a reference structure including a reference bitmap in a computer system.

DESCRIPTION OF THE RELATED ART

Data processing systems include various types of memory to process and store data. A main storage or mainstore is program addressable storage from which data is loaded directly into registers of a central processing unit (CPU) for processing. Auxiliary memory is addressable storage other than the mainstore that is accessed by input/output (I/O) channels and includes direct access storage devices (DASDs). A common data source, such as a database file can include large amounts of data to be transferred between the auxiliary memory, such as the DASD and the mainstore.

On database systems, there is a need for efficient use of the mainstore and a need to efficiently handle large amounts of data. A bitmap is a construct often used to indicate which underlying data items are of interest. These items may be complete pages, or database entries which may be smaller than a page, thus having multiple entries per page, or one entry may be large enough to span multiple pages. Two conflicting constraints that need to be minimized are the number of IO operations done, and the number of wasted pages read to mainstore. If the ON bits in the bitmap correspond to every other page, and a read request is scheduled for every bit, the number reads would be too high. It would be better to request a larger read, including the unneeded pages to minimize the number of reads. However, if the ON bits are far apart, such that dozens of pages are skipped between represented pages, flushing mainstore with the large number of unneeded pages would not be desirable. It would be better to schedule multiple individual read requests. A need exist for an effective mechanism to achieve a balance between these conflicting constraints.

Also it is desirable to schedule the read requests in an asynchronous fashion, so that the needed pages can be read into mainstore before the pages are actually needed. This saves needing to wait for the IO operations. Typically the bitmap needs to be processed twice; once to know what pages to schedule for reading in the asynchronous phase, and once to know which entries to process, in the synchronous phase. As extracting bits from a bitmap can be expensive, it is desirable to minimize this cost as well.

Another consideration when doing any sort of read requests is that the pages are being read into a constrained storage pool. It is important to not read more than the storage pool can hold. If this happens, when it is time for the synchronous phase to process the pages, needed pages may have been forced out by the new pages being brought in. Efficient management of the storage pool is needed, including identifying page frames which can be used for the next read request, if they are known to be available.

SUMMARY OF THE INVENTION

A principal object of the present invention is to provide an improved method and computer program product for paging control using a reference structure in a computer system. Other important objects of the present invention are to provide such method and computer program product for paging control substantially without negative effects and that overcome many disadvantages of prior art arrangements.

In brief, a method and computer program product are provided for paging control using a reference structure in a computer system. The reference structure is scanned to identify a next selected entry for an IO range building routine. The next selected entry is compared with a set hardlimit value. Responsive to the next selected entry being greater than the hardlimit value, the IO range building routine is exited. A shortlimit value is identified. The next selected entry is compared with the identified shortlimit value. Responsive to the next selected entry being greater than the identified shortlimit value, the IO range building routine is exited.

In accordance with features of the invention, a first array is used for storing entry IDs for selected entries found from scanning the reference structure and a second array is used for tracking blocks of storage used for the selected entries.

BRIEF DESCRIPTION OF THE DRAWINGS

The present invention together with the above and other objects and advantages may best be understood from the following detailed description of the preferred embodiments of the invention illustrated in the drawings, wherein:

FIG. 13 is a block diagram illustrating a computer program product in accordance with the preferred embodiment.

DETAILED DESCRIPTION OF THE PREFERRED EMBODIMENTS

Figure 1:
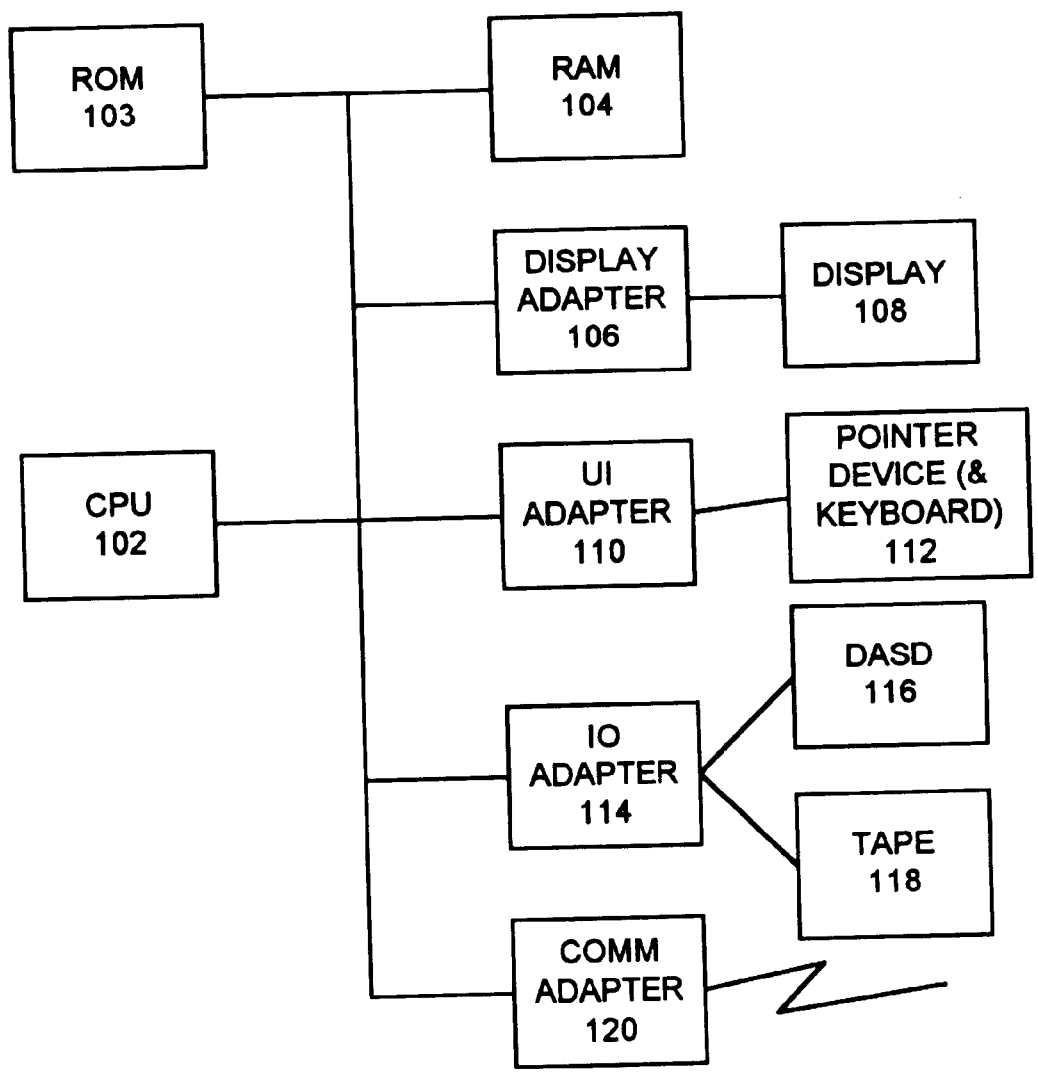
FIGS. 1 and 2 are block diagram representations illustrating a computer system, operating system, and array structures for implementing methods for paging control using a reference structure in accordance with the preferred embodiment.
Figure 2:
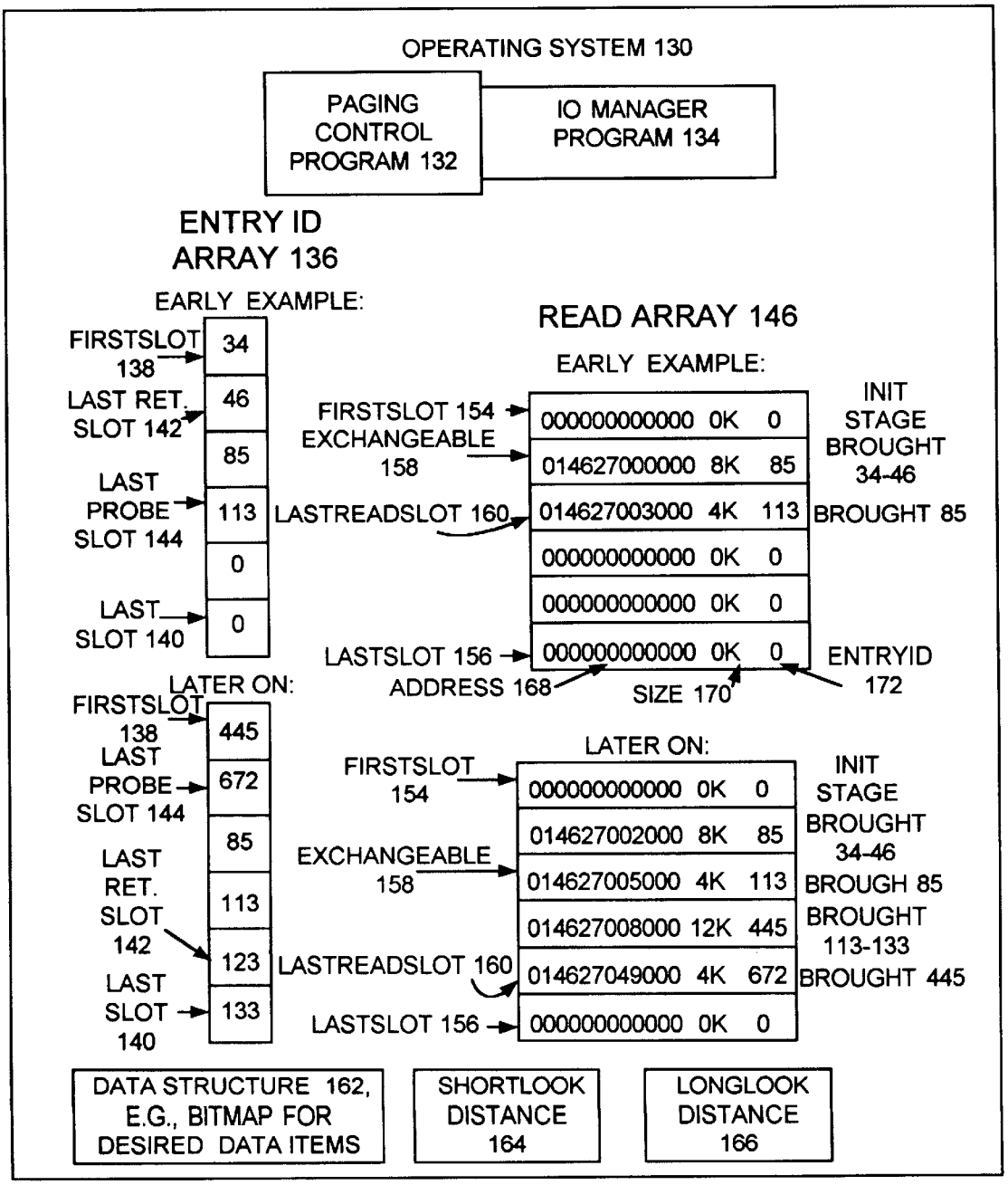

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory or mainstore 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130, a paging control program 132 of the preferred embodiment used in conjunction with an IO manager program 134. In FIG. 2, an early example and a later example are provided of a first array labeled ENTRY ID ARRAY 136 of the preferred embodiment. The ENTRY ID ARRAY 136 includes multiple slots from a first slot 138 to a last slot 140 for storing two array indexes, a LastReturnedSlot 142 and a LastProbeSlot 144. Also an early example and a later example are provided of a second array labeled READ ARRAY 146 of the preferred embodiment. The READ ARRAY 146 includes multiple slots from a first slot 154 to a last slot 156 for storing two array indexes, an Exchangeable slot 158 and a LastReadSlot 160.

The first array labeled ENTRY ID ARRAY 136 is used for recording which entries are needed, and the second array labeled READ ARRAY 146 is used to keep track of the storage read for those entries. This second read array 146 is needed to track the discontiguous pieces of storage so they can be freed later on, when no longer needed for the synchronous phase. The IO operations to be scheduled includes either DASD write requests or read requests. In the case of DASD write requests, a data structure 162, such as bitmap 162 typically is built during synchronous processing, for example, during database record updates. After some amount of the update phase, the bitmap 162 is passed to this IO manager 134 to asynchronously write the changed pages. Only one pass is needed through the bitmap. In the case of DASD read requests, the bitmap 162 typically indicates which entries are to be processed.

In accordance with features of the invention, rather than probe the bitmap 162 twice for every entry, once during a look ahead phase, and once during the processing phase; the entries found during the look ahead phase are saved in the ENTRY ID array 136. The saving of the Entry ID fills up the ENTRY ID array 136. The ENTRY ID array 136 is read during the synchronous processing phase. This empties the array. Whenever the ENTRY ID array 136 gets below a certain fullness, for example less than ⅜ full, more entries are added. The size of the ENTRY ID array 136 itself needs to be large enough to allow sufficient asynchronous reads to be issued to stay ahead of the synchronous processing phase. The array indexes, LastReturnedSlot 142 and LastProbeSlot 144, are used to keep track of two positions. LastReturnedSlot 142 addresses the array slot containing the ordinal number most recently processed by the synchronous phase. LastProbeSlot 144 addresses the array slot containing the ordinal number most recently retrieved from scanning the bitmap 162.

When processing asynchronous read requests, care must be taken so that an allocated storage pool for the process does not overflow. Tracking the current use of the allocated storage pool is provided by the paging control method of the preferred embodiment. The current use of the allocated storage pool is incremented by an appropriate storage amount for each asynchronous read. The current use of the allocated storage pool is decremented by an appropriate storage amount when the asynchronous processing phase sees that the synchronous processing phase is finished with the prior data block.

The READ array 146 is used to track the blocks of storage brought in by the paging control program 132 of the preferred embodiment. The data in the elements of this array are an address 168 of the storage, a size 170 of that storage; and an entry ID 172 used to identify where the storage is no longer needed. Consider for example, a block of storage that has entries 45 through 97. If the entry last processed using LastReturnedSlot 142 is 54, the storage block will still be used by the processing phase, and cannot be used for exchange. If the entry to be processed is 113, the storage block including entries 45 through 97 can be used for exchange. The READ array 146 includes enough array elements to track sufficient storage for each entry found and placed in the ENTRY ID array 136. Since there is not more than one storage request per entry ID, setting the READ array 146 and the ENTRY ID array 136 to have the same number of entries is sufficient. The array indexes, Exchangeable slot 158 and LastReadSlot 160 are used to keep track of these two positions. LastReadSlot 160 addresses the array slot containing the information about the block of storage most recently read. Exchangeable slot 158 addresses the array slot containing the information about the block of storage least recently used, and thus most likely to be available for exchange and subtracting from our storage.

In accordance with features of the preferred embodiment, based upon predetermined factors, such as the size of the storage pool allocated to the process, a dynamic ShortLook distance 164 is calculated indicating how much storage can be wasted by pages being read in that do not have any entries to process. Also a LongLook distance 166 is calculated indicating how many pages can be brought in efficiently as a maximum. The ShortLook distance 164 and the LongLook distance 166 will vary based upon the design points of a particular storage subsystem, so that an absolute number cannot be stated for all systems.

Predetermined factors for identifying the ShortLook distance 164 and the LongLook distance 166 include a maximum read size for the storage subsystem. A storage subsystem, such as IO adapter 114 and DASD 116 in FIG. 1, usually has a maximum read size. If a request is made to read more than that, the subsystem will break the request into multiple reads. The size of the pool also is a factor; if the pool is small, the number of wasted pages should be kept small. Paging activity can also is a factor. If the storage subsystem provides information that the IO activity in a pool is high, the wasted storage should be smaller than if the other IO activity is low.

One factor that does not need to be considered is the entry length while concerned about wasted pages. For short entries, the selected entry IDs can be farther apart. For longer entries, the selected entry IDs would need to be consecutive to avoid breaking up the IO operation.

At one end of the spectrum, if the entry IDs selected by the bitmap are farther apart than the maximum read or bring size, read requests should only be scheduled for the pages with the entries on them. At the other end, if the entries selected correspond to consecutive pages, it is good to schedule reads for the entire file. If there is a selected entry at least every ShortLook pages, reads will be scheduled for the entire file. The identified size chosen is called the ShortLook 164.

Using the bitmap to control asynchronous read requests followed by synchronous processing of the entries, while managing a constrained storage pool is illustrated and described with respect to FIGS. 3–12. It should be understood that the paging control algorithm of the preferred embodiment advantageously is used for optimizing both read and write requests, and is used when a bit represents a page or when a bit represents more or less than one page.

Figure 3:
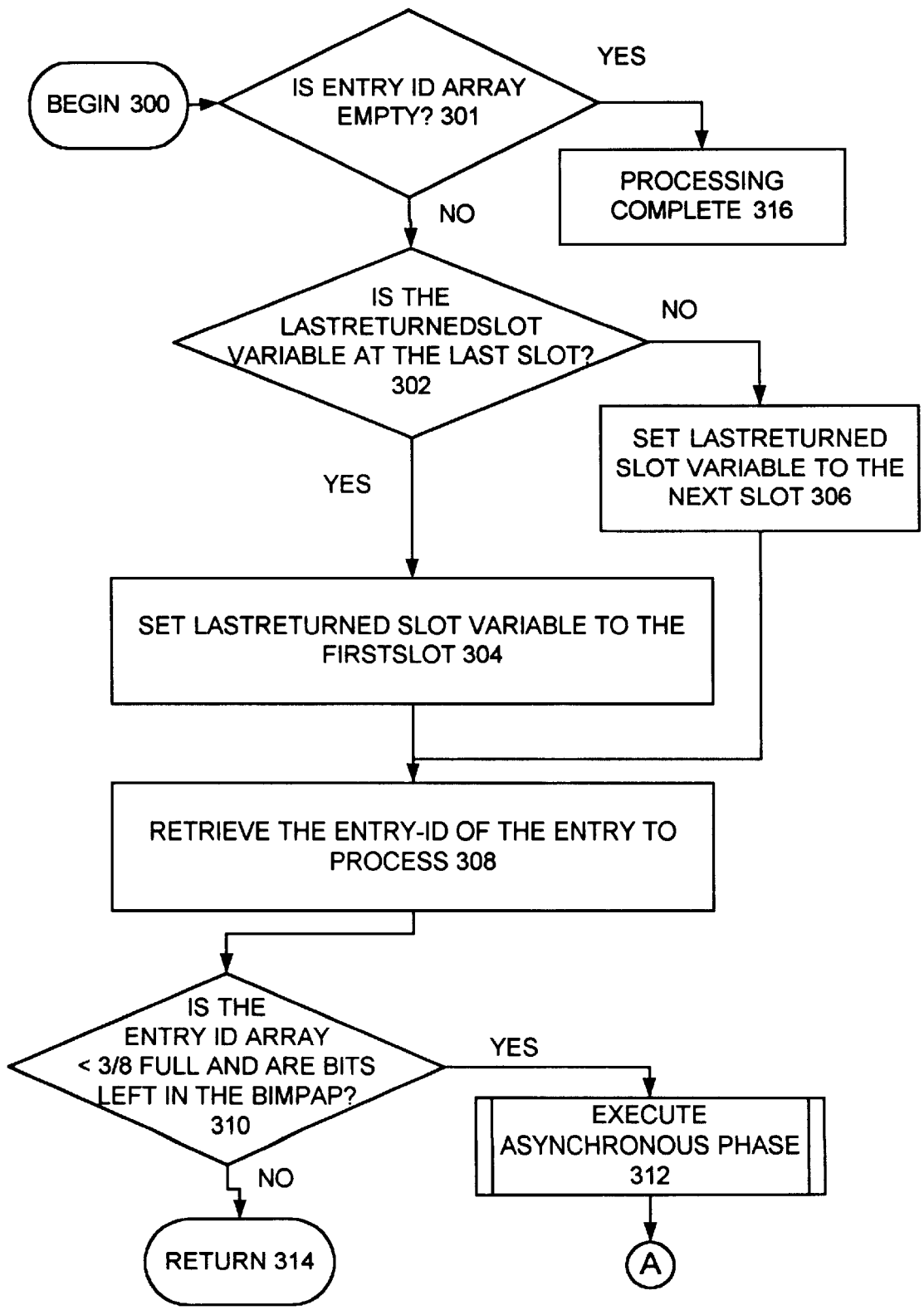
FIG. 3 is a flow chart illustrating exemplary steps for synchronous processing phase for paging control in accordance with the preferred embodiment.

Referring now to FIG. 3 and TABLE 1 below, exemplary steps performed starting at a block 300 and pseudo code for the synchronous processing phase are shown. As indicated at a decision block 301, checking is performed to determine if the Entry ID array 136 is empty. If the Entry ID array 136 is not empty, checking is performed to determine if the LastReturnedSlot variable at the last slot as indicated at a decision block 302. If so, then the LastReturnedSlot 142 is set to the first slot as indicated at a block 304, since the array 136 is processed circularly. Else the LastReturnedSlot 142 is set to the next slot as indicated at a block 306. The entry-ID of the entry to process is retrieved as indicated at a block 308. As indicated at a decision block 310, checking is performed to determine if the ENTRY ID array 136 less than ⅜ full and there are bits left in the bitmap. If determined at decision block 312 that the ENTRY ID array 136 is less than ⅜ full and there are bits left in the bitmap, then as indicated at a block 312 the asynchronous phase is executed to get more pages on their way into main store. If the ENTRY ID array 136 is not less than ⅜ full or bits are not left in the bitmap, then as indicated at a block 314, the sequential steps return continuing with the synchronous phase. When determined at decision block 301 that the ENTRY ID array 136 is empty, then processing is complete as indicated at a block 316.

Figure 4:
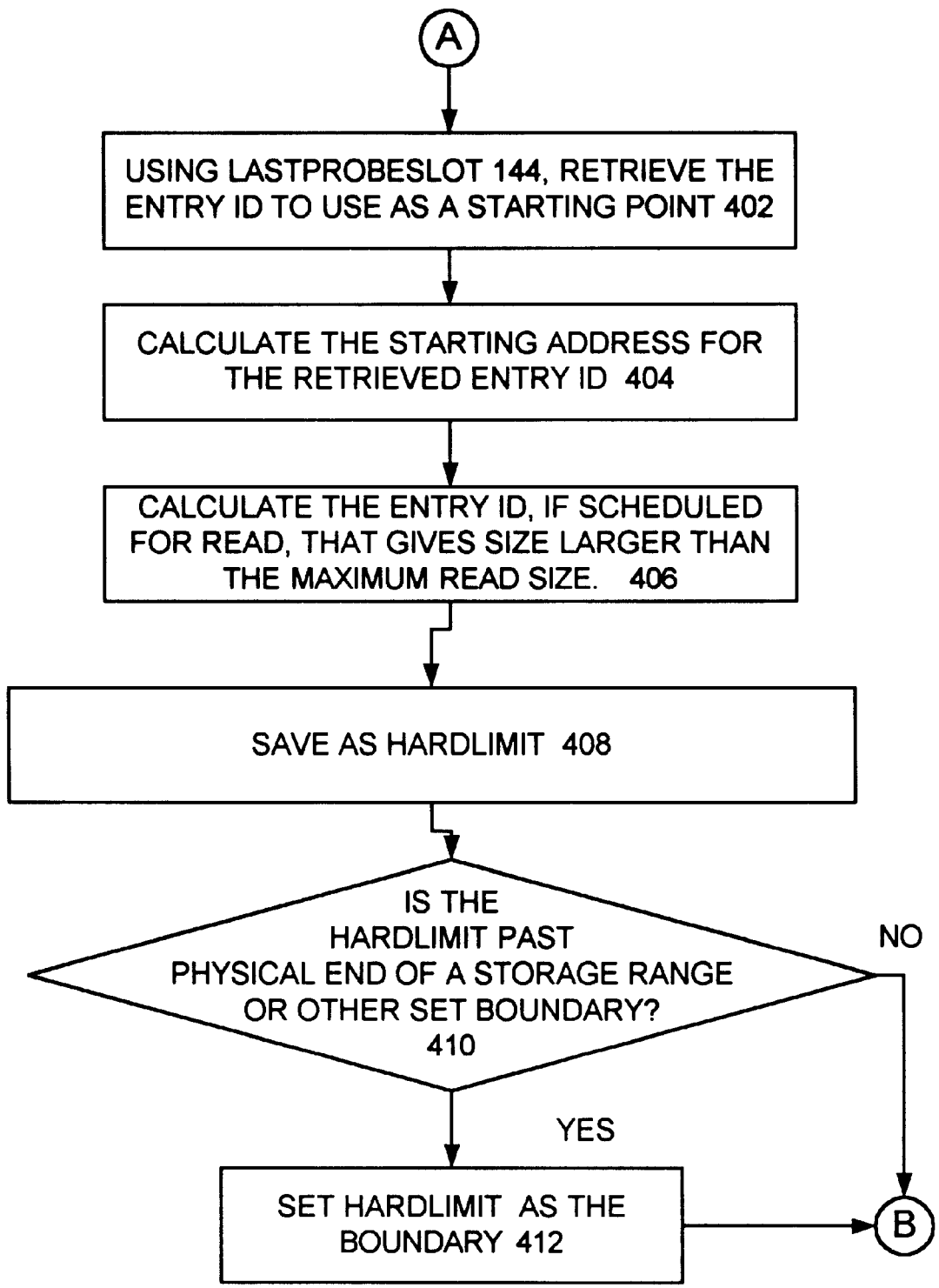
FIGS. 4–12 are flow charts illustrating exemplary steps for asynchronous processing phase for paging control in accordance with the preferred embodiment.

Referring now to FIGS. 4–12 and TABLE 2 below, exemplary steps performed starting after entry block A in FIG. 4 and pseudo code together with comments for the asynchronous processing phase are shown. Using LastProbeSlot 144, the entry ID to use as a starting point is retrieved as indicated at a block 402. This was retrieved from the bitmap last time, but its storage was not scheduled for a read. The main Loop is repeated as long as there are resources left to build read requests. The arrays 136 and 146 may fill up, the storage pool may fill as well. Each time through this loop another read request will be scheduled.

As indicated at a block 404, the starting address to start the read request for the entry ID is calculated. At blocks 406 and 408 the entry ID which, if scheduled for read, would give a size larger than the maximum read size is calculated and saved in HardLimit. As indicated at a decision block 410, checking is performed to determine if the calculated HardLimit is past the physical end of a storage range, or other boundary of interest. If so, then the HardLimit is set to be the boundary as indicated at a block 412.

Figure 5:
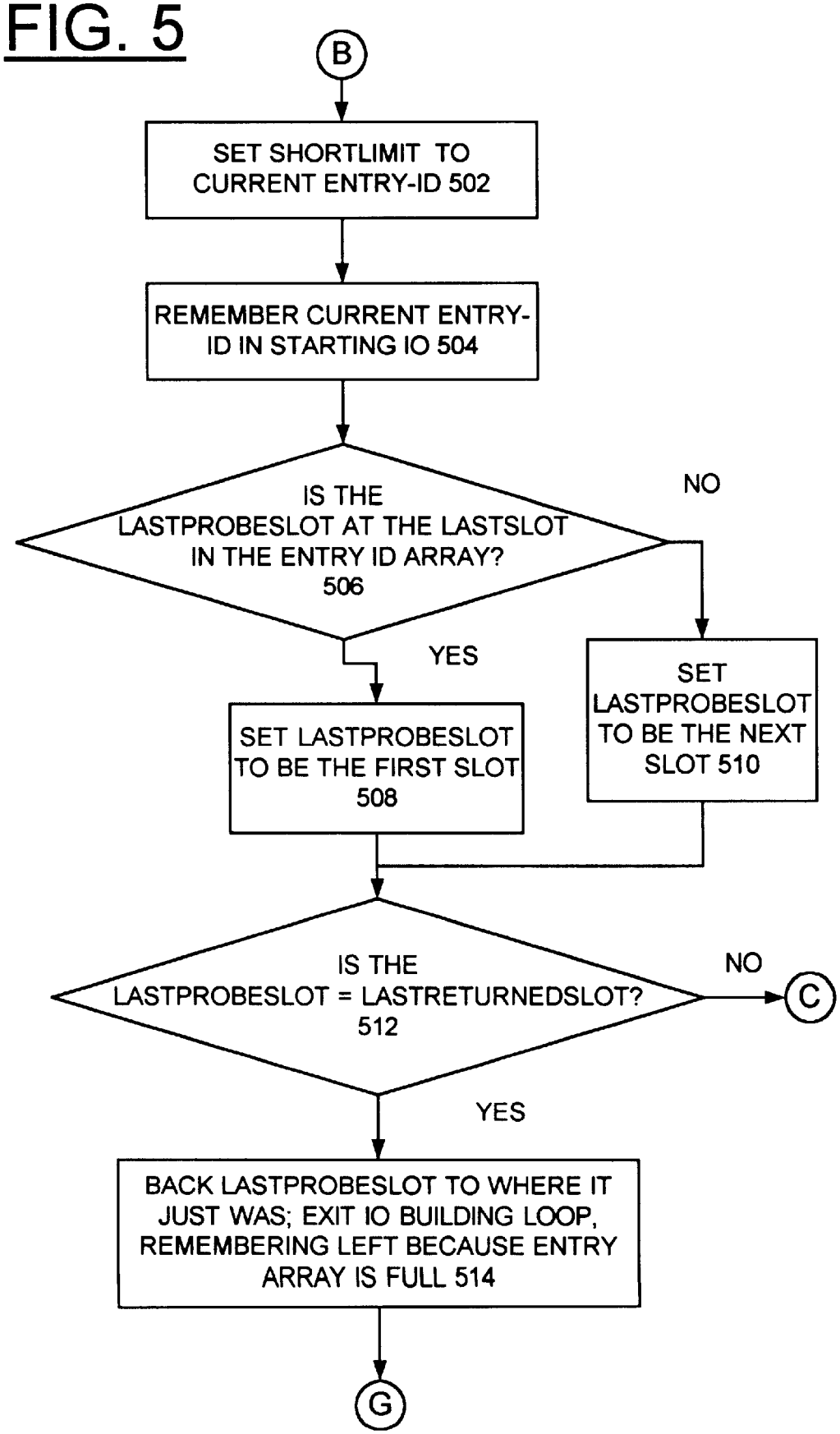

Referring to FIG. 5, inside the next loop is a check to see if the Entry ID found by scanning the bitmap leaves too big of a gap or more than ShortLook pages 164. This calculation uses the previously found entry ID, and ShortLook 164, and stores its results is ShortLimit. To get it set up correctly for the test inside the loop, ShortLimit is set to be the current Entry ID as indicated at a block 502. The current entry ID is stored in StartingIo as indicated at a block 504. Then LOOPing continues until a spot to break this read request is reached and the current entry ID is stored in PreviousEntry ID. Then a new spot is obtained to store the entry ID we get back from scanning the bitmap as indicated at blocks 506, 508 and 510. If determined at decision block 506, that the LastProbeSlot 144 is at the LastSlot in the ENTRY ID array 136, then the LastProbeSlot 144 is set to be the FirstSlot 138 at block 508. Otherwise, the LastProbeSlot 144 is set to be the next Slot at block 510. Checking to see if the array is about to overfill is performed as indicated at a decision block 512, where the LastProbeSlot 144 is compared with the LastReturnedSlot 142. If the LastProbeSlot 144 equals the LastReturnedSlot 142, then finding more entry Ids is stopped, and the read request built up so far is done exiting the IO building loop as indicated at a block 514. Sequential steps continue following entry block G in FIG. 8 after exiting the IO building loop at block 514. Otherwise if the LastProbeSlot 144 does not equal the LastReturnedSlot 142, then sequential steps continue following entry block C in FIG. 6.

Figure 6:
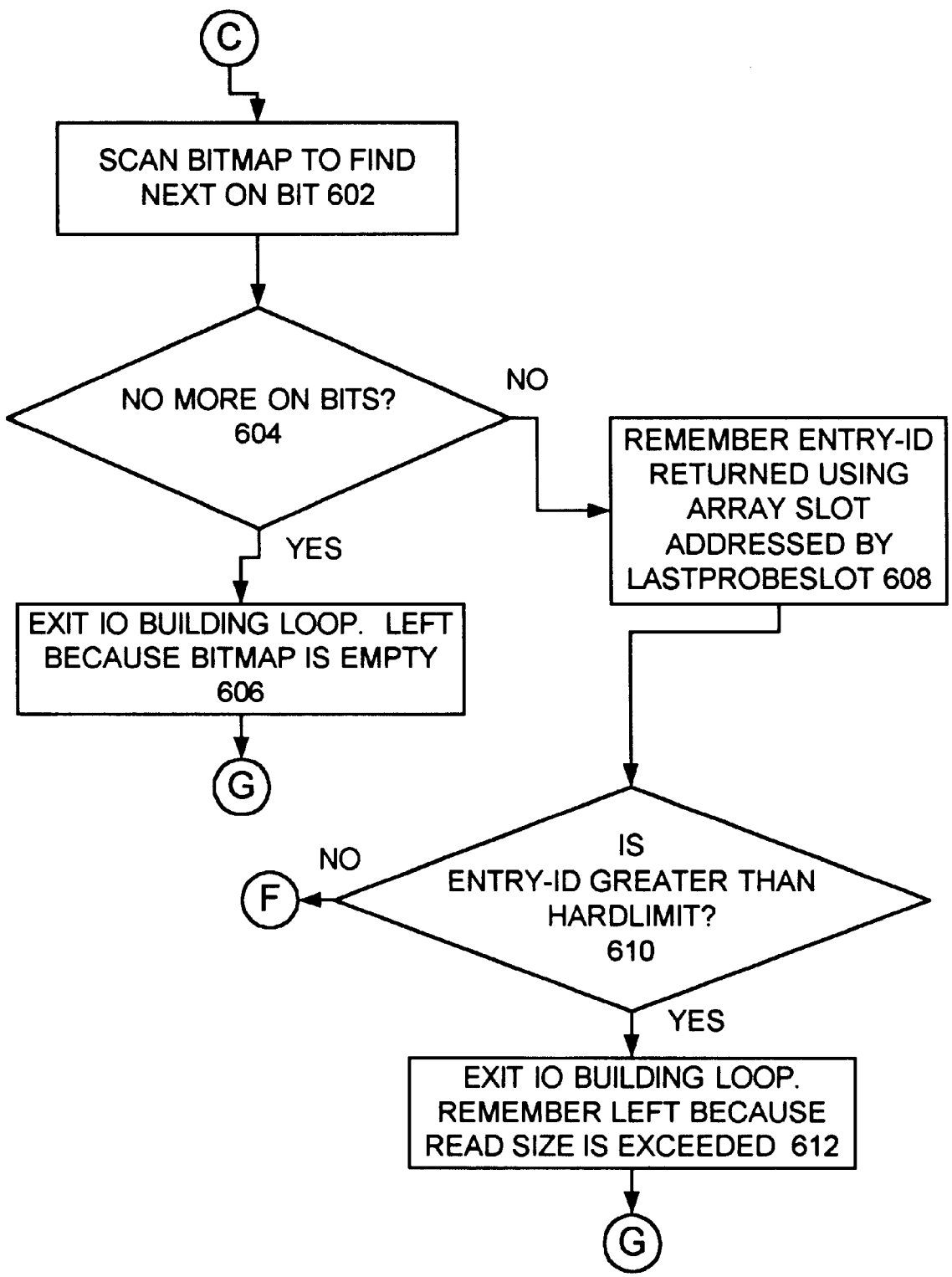

Referring to FIG. 6, the bitmap 162 is scanned to find the next ON bit as indicated at a block 602. If determined that there are not any more ON bits, then the IO Building loop is left because of an empty bitmap as indicated at a block 606. Otherwise, the Entry ID returned is remembered using the array slot addressed by LastProbeSlot 144 as indicated at a block 608. Then it is determined whether to add this entry ID to this IO, or is it time for a break. As indicated at a decision block 610, it is determined whether the Entry ID is greater than the HardLimit. If so, then the IO Building loop is left because of read size being exceeded as indicated at a block 612. Otherwise the sequential steps continue following entry point F in FIG. 7.

Figure 7:
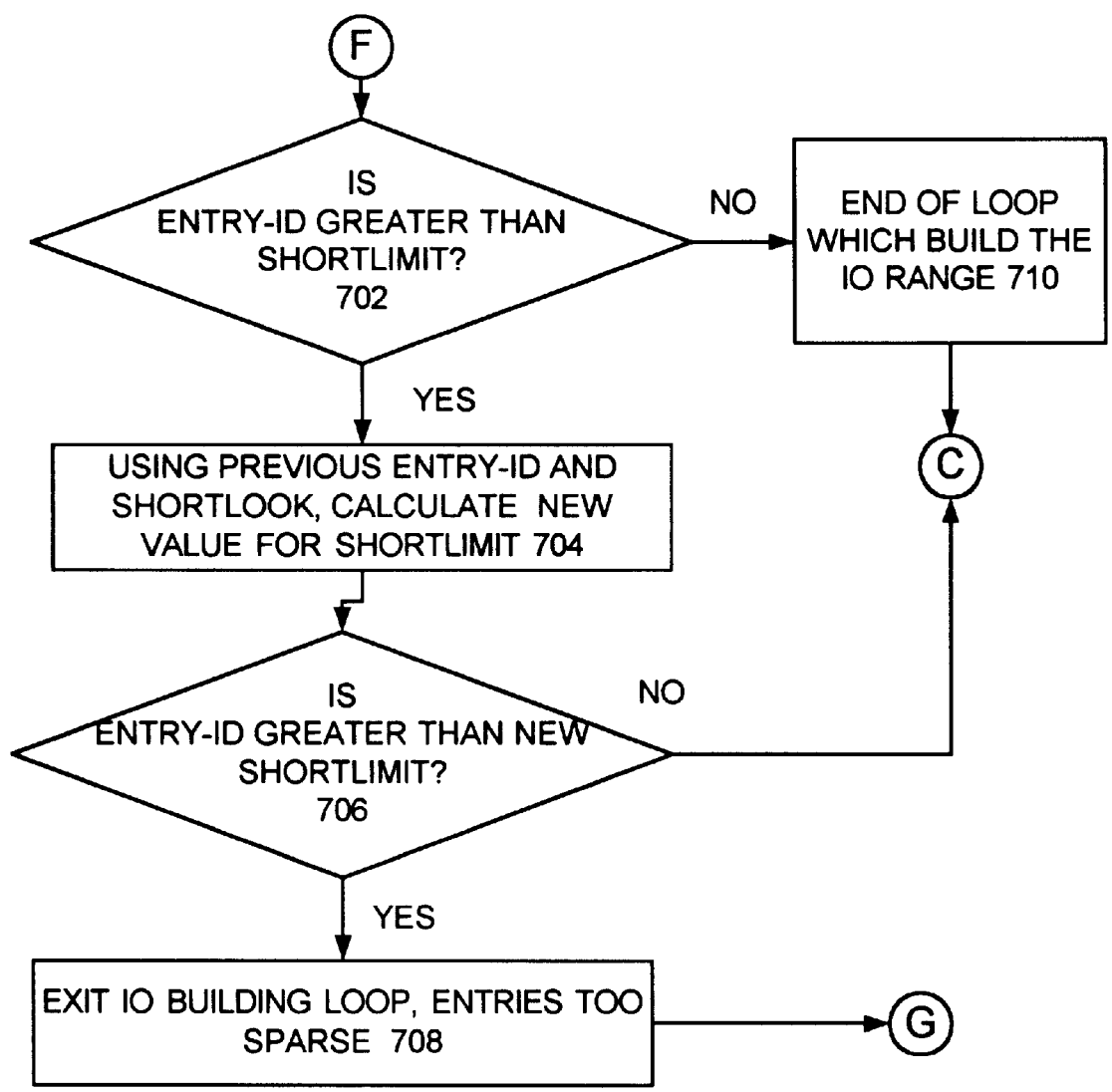

Referring to FIG. 7, if determined at decision block 610 that the Entry ID is not greater than the HardLimit, then it is determined whether the Entry ID is greater than the ShortLimit as indicated at a decision block 702. The Entry ID always will be greater than the ShortLimit the first time through the loop. When the Entry ID is greater than the ShortLimit, using PreviousEntry ID and ShortLook, a new value for ShortLimit is calculated. Each time an entry is found Within ShortLook pages, it marks a new spot for the gap to start. As such, the value needs to be recalculated for the ShortLimit each time it is exceeded as indicated at a block 704. As indicated at a decision block 706, checking is performed to determine if the Entry ID is greater than the new value for ShortLimit. If so, then the IO Building loop is left because the entries are too sparse causing too large of a gap as indicated at a block 708. Otherwise when determined that the Entry ID is not greater than the ShortLimit at decision block 706, then the sequential operations return to block 602 in FIG. 6 to scan the bitmap 162 to find the next ON bit. Otherwise when determined that the Entry ID is not greater than the ShortLimit at decision block 702 and 706, the end the Loop which builds the IO range is reached as indicated at blocks 710 and then returning to block 602 in FIG. 6.

Now that an IO Boundary has been reached having done some looking at the bitmap, it is time to bring in the storage that has been collected, next calculating how large a block of storage is to be read. The entry ID just found is not included; this entry ID is read in the next IO.

Figure 8:
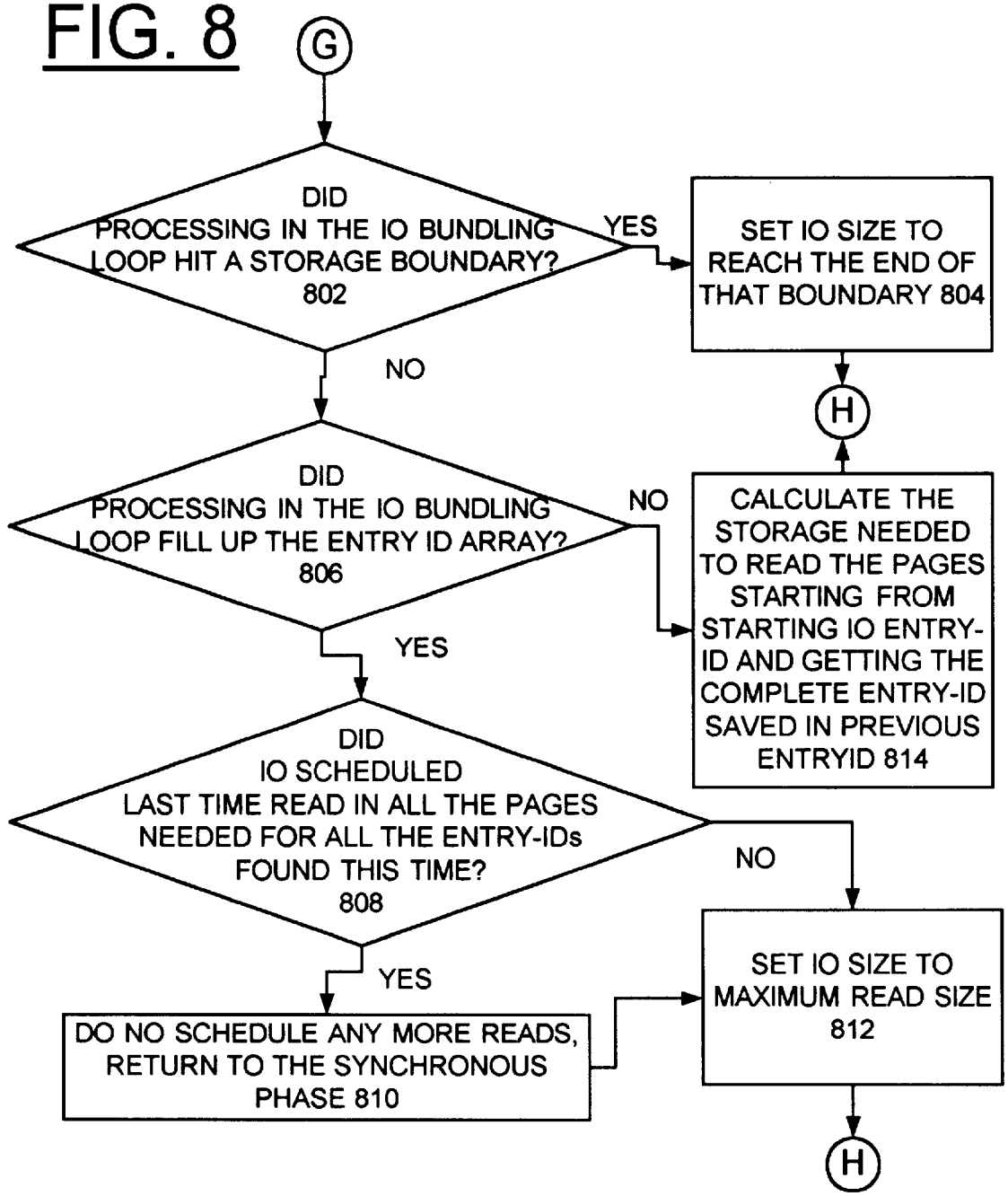

Referring to FIG. 8, then it is determined whether the processing in the IO Bundling loop hit a storage boundary as indicated at a decision block 802. The IO Size is set to reach to the end of that boundary as indicated at a block 804. If Entries can wrap from the end of this storage section to the beginning of the next, this is the place to handle that situation as well. Otherwise if the processing in the IO Bundling loop did not hit a storage boundary, then it is determined whether the processing in the IO Bundling loop fill up the ENTRY ID array 136 as indicated at a decision block 806. If so, then special processing is needed for a completely filled entry ID array. If the entry ID array is completely filled, the scanning of the bitmap has reached a dense region. As indicated at a decision block 808, it is determined whether the IO scheduled last time read in all the pages needed for all the entry-IDs found this time. If yes, then more reads are not scheduled, and the sequential steps return to the synchronous phase as indicated at a block 810. Otherwise when determined that the IO scheduled last time did not read in all the pages needed for all the entry-IDs found this time, the IO Size is set to be the maximum read size as indicated at a block 812. When determined at decision block 806 that the processing in the IO Bundling loop did not fill up the ENTRY ID array 136, then the required storage to read the pages starting from StartingIO Entry ID is calculated, getting the complete entry-ID saved in PreviousEntry ID as indicated at a block 814. The sequential operations following blocks 804, 812 and 814 continue as shown in FIG. 9.

Figure 9:
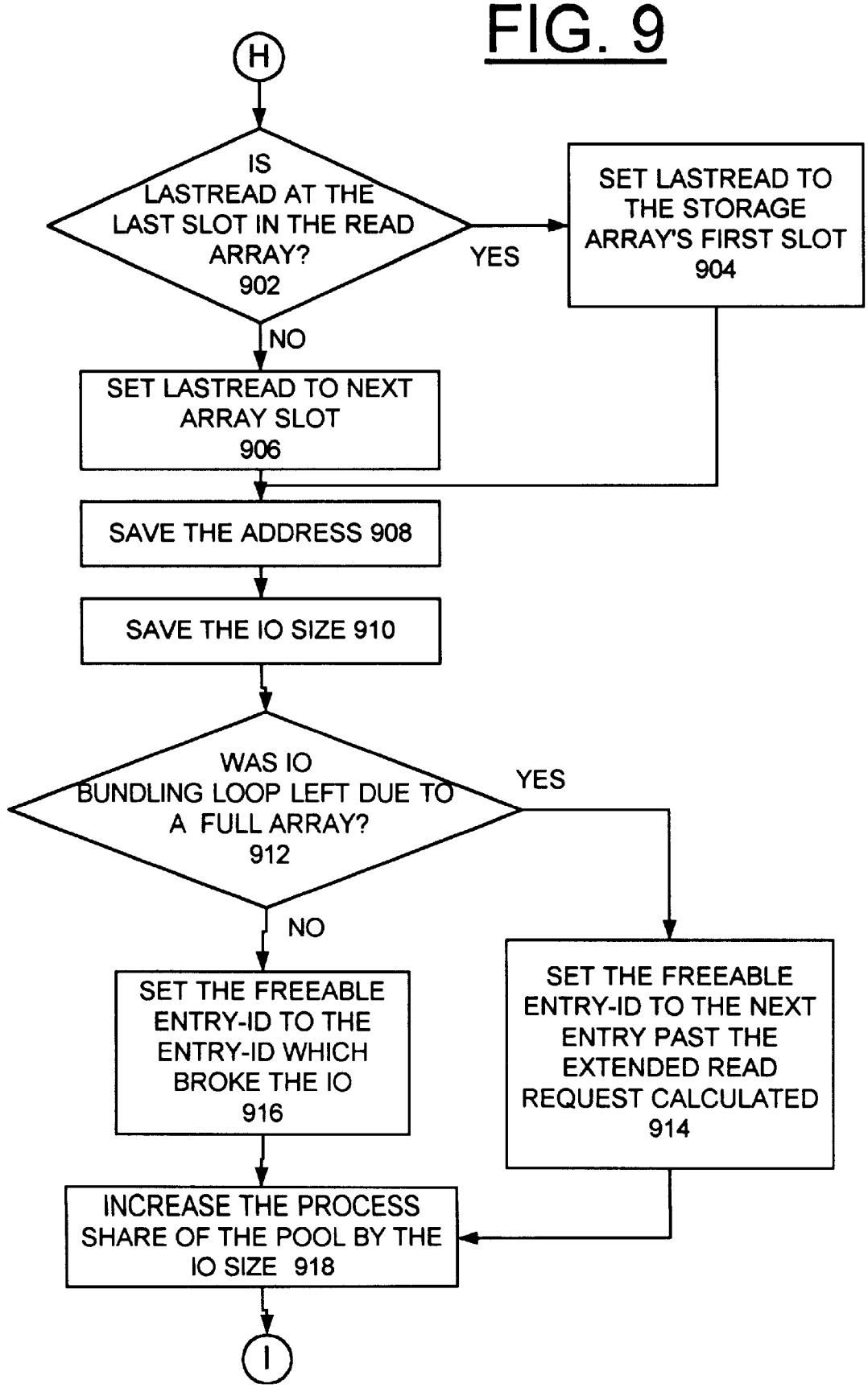

Referring to FIG. 9, as indicated at a decision block 902 it is determined whether the LastReadSlot 160 in the READ array 146 is at the last slot 156. If yes, then the LastReadSlot 160 is set to the FirstSlot 154 of storage array 146 as indicated at a block 904. Else, the LastReadSlot 160 is set to the next array slot as indicated at a block 906. Then the address 168 and the IO Size 170 are saved as indicated at blocks 908 and 910. The remaining element of information, the entry ID 172 when this storage is not used anymore, depends upon whether the IO Bundling loop was left because of a full array.

Checking whether the IO Bundling loop was left due to a full array is performed as indicated at a decision block 912. If so, then the FreeAble Entry ID is set to be the next entry past the extended read request calculated (StartingIO+ MaxReadSize/EntryLen) as indicated at a block 914. Otherwise the FreeAble Entry ID is set to be the entry ID which broke the IO as indicated at a block 916. The process share of the pool is increased by the IO Size as indicated at a block 918 to maintain the constrained storage pool for the process.

Figure 10:
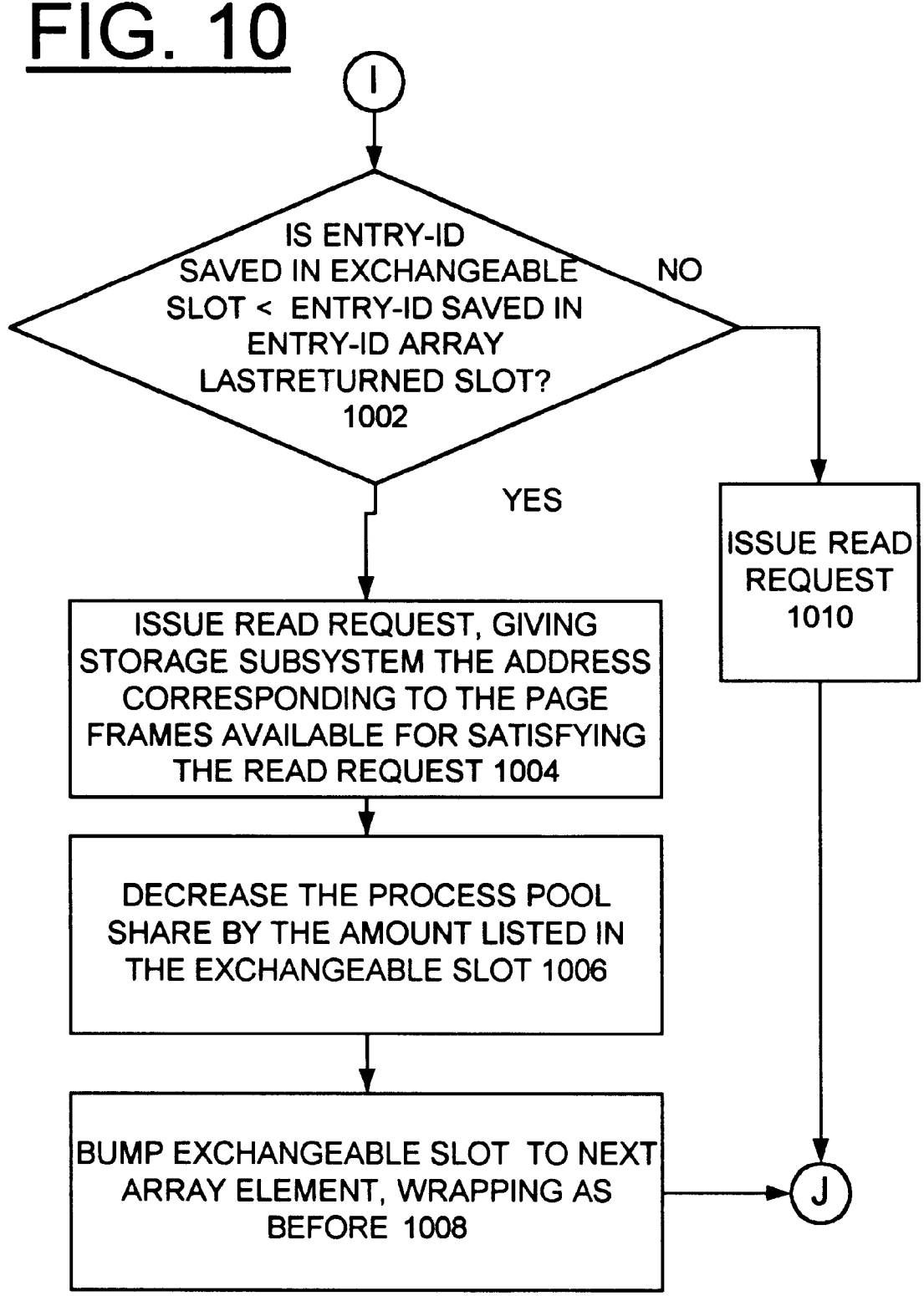

Referring to FIG. 10, as indicated at a decision block 1002 it is determined whether the Entry ID saved in Exchangeable Slot 158 is less than the Entry ID saved in the Entry ID array's LastReturnedSlot 142. Exchangeable Slot 158 points to a read request done some time ago. When that IO was done, the entry ID was remembered where it was no longer needed for the synchronous phase. When the Entry ID saved in Exchangeable Slot 158 is less than the Entry ID saved in the ENTRY ID array 136, LastReturnedSlot 142, the Read request is issued, also giving the storage subsystem the address corresponding to the page frames available for satisfying the read request as indicated at a block 1004. As indicated at a block 1006, the process' share of the pool is decreased by the amount listed in the Exchangeable Slot 158. The Exchangeable Slot 158 is bumped to the next array element, wrapping as described before as indicated at a block 1008. When the Entry ID saved in Exchangeable Slot 158 is not less than the Entry ID saved in the ENTRY ID array 136, LastReturnedSlot 142, the Read request is issued as indicated at a block 1010.

Figure 11:
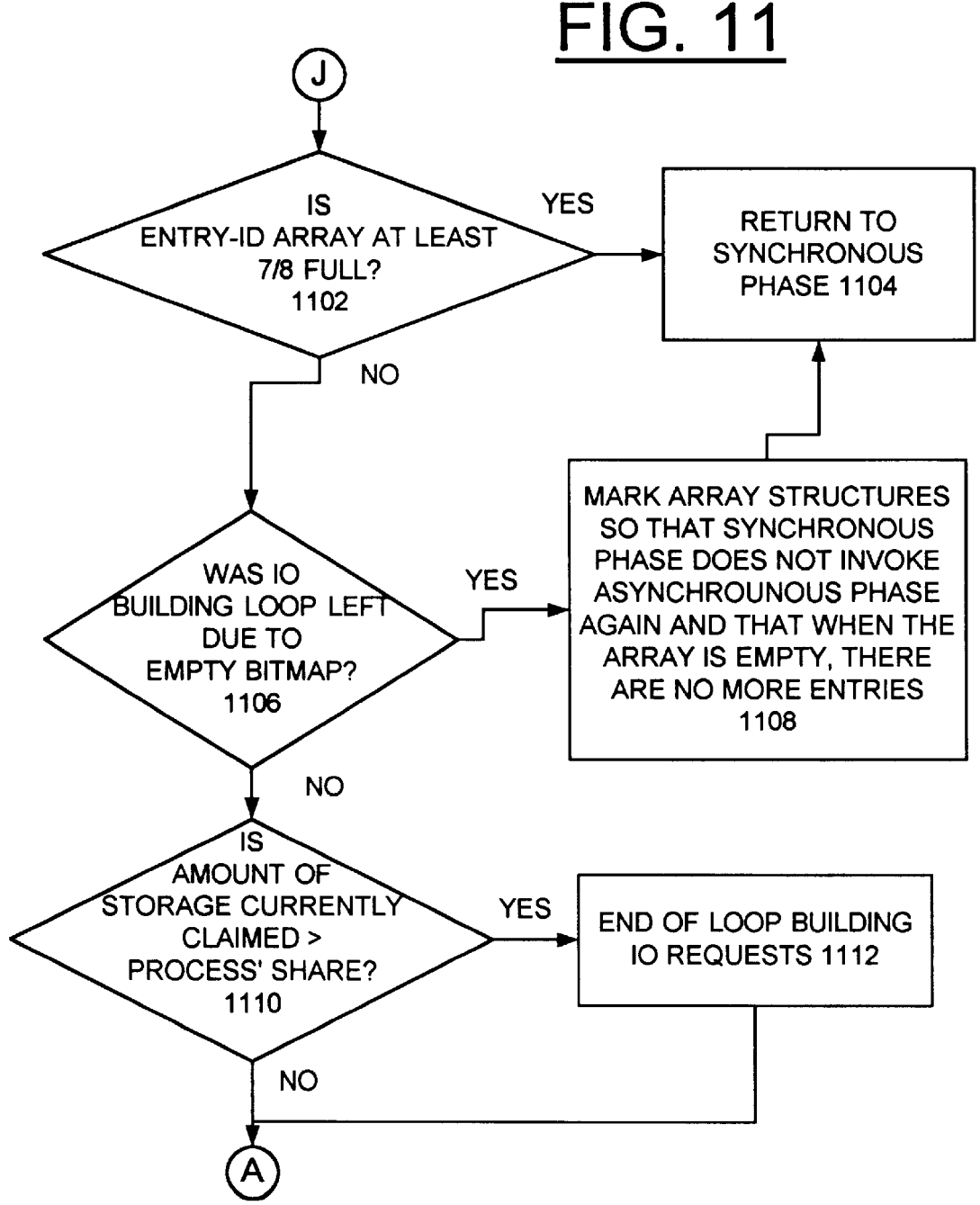

Referring to FIG. 11, it is determined if the ENTRY ID array 136 nearly full, such as at least ⅞ full as indicated at a decision block 1102. If the ENTRY ID array 136 fills up, an IO must be issued for whatever has been scanned thus far, regardless if a nice IO boundary has been reached. It is desirable to try to stop a little before the ENTRY ID array 136 fills up, if possible. If the ENTRY ID array 136 is nearly full, such as at least ⅞ full, then the sequential operations return to the Synchronous phase as indicated at a block 1104. If the ENTRY ID array 136 is not at least ⅞ full, then it is determined if the IO Building loop was left due to the end of the bitmap being reached as indicated at a decision block 1106. If yes, the array structures are marked such that the synchronous phase does not invoke this asynchronous phase again, and that when the array is empty, there are no more entries as indicated at a block 1108. Then the sequential operations return to the Synchronous phase as shown at block 1104. Otherwise if the IO Building loop was not left due to the end of the bitmap being reached, it is determined whether the amount of storage currently claimed is more than the process share of the pool as indicated at a decision block 1110. If not, then end of loop building IO requests is reached as indicated at a block 1112. Then the sequential operations return to block 402 in FIG. 4 following entry point A.

Figure 12:
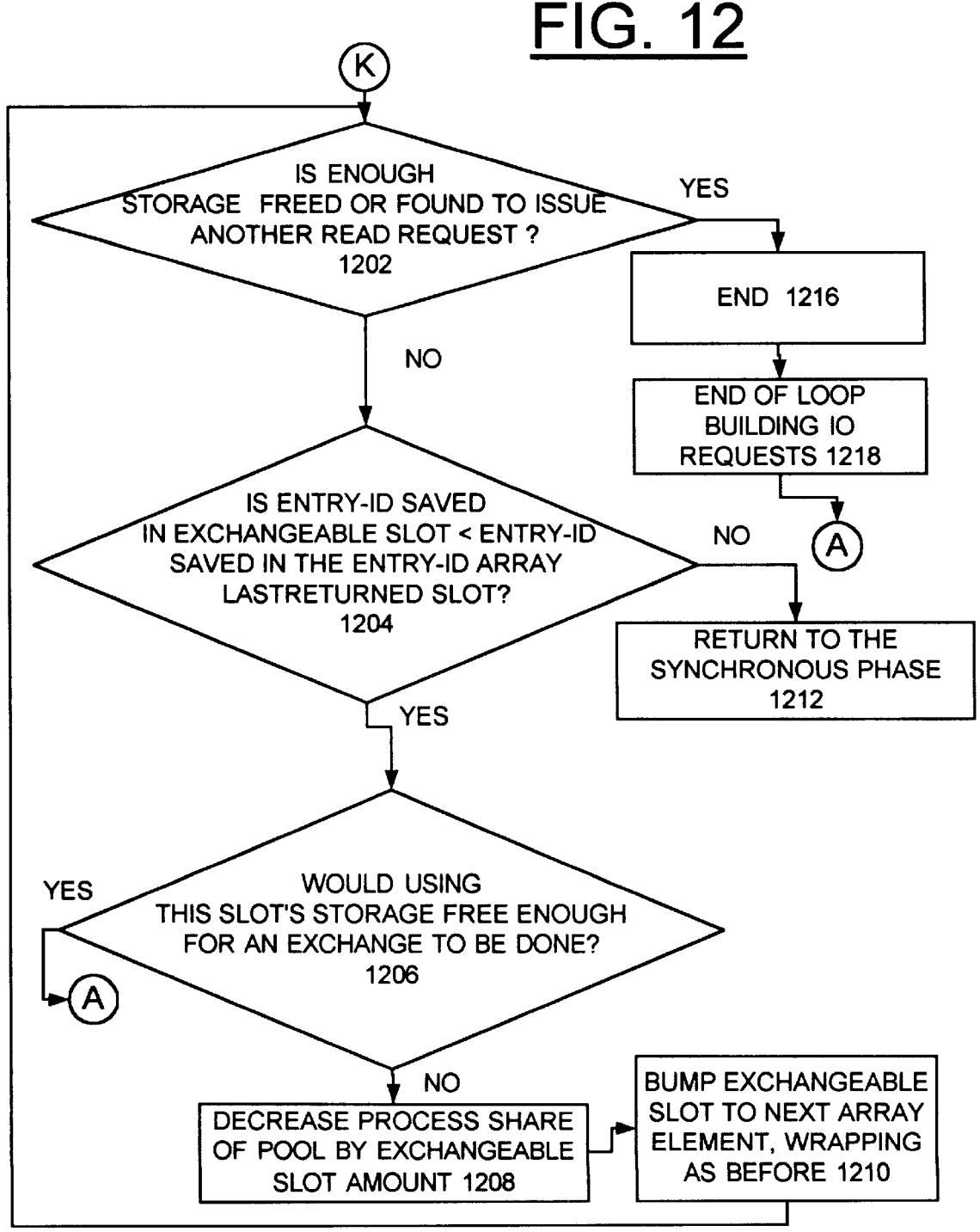

Referring to FIG. 12, if determined at block 1110 that the amount of storage currently claimed is more than the process share of the pool, then LOOPing is provided until enough storage has been freed or found to allow another read request to be issued as indicated at a decision block 1202. As indicated at a decision block 1204, it is determined if the Entry ID saved in Exchangeable Slot 158 is less than the Entry ID saved in the LastReturnedSlot 142 in the ENTRY ID array 136. If so, then it is determined if using this slot's storage would free up enough for an exchange to be done as indicated at a decision block 1206. If so, then this inner loop is left to go around the main loop again returning to block 402 in FIG. 4 following entry point A. Otherwise if using this slot's storage would not free up enough for an exchange to be done, then the process' share of the pool is decreased by the amount listed in the Exchangeable Slot 158 as indicated at a block 1208. The Exchangeable Slot 158 is bumped to the next array element, wrapping as before as indicated at a block 1210. Then the sequential steps return to block 1202. When it is determined at decision block 1204 that the Entry ID saved in Exchangeable Slot 158 is not less than the Entry ID saved in the LastReturnedSlot 142 in the ENTRY ID array 136, then operations are returned to the synchronous phase as indicated at a block 1212. When enough storage has been freed or found to allow another read request to be issued at decision block 1202, operations end as indicated at a block 1216. The end of loop building IO requests is reached as indicated at a block 1218.

Referring now to FIG. 13, an article of manufacture or a computer program product 1300 of the invention is illustrated. The computer program product 1300 includes a recording medium 1302, such as, a floppy disk, a high capacity read only memory in the form of an optically read compact disk or CD-ROM, a tape, a transmission type media such as a digital or analog communications link, or a similar computer program product. Recording medium 1302 stores program means 1304, 1306, 1308, 1310 on the medium 1302 for carrying out the paging control methods of the preferred embodiment in the system 100 of FIGS. 1 and 2.

A sequence of program instructions or a logical assembly of one or more interrelated modules defined by the recorded program means 1304, 1306, 1308, 1310, direct the computer system 100 for implementing paging control methods of the preferred embodiment.

TABLE 1 Pseudo Code for the Synchronous Processing Phase:

IF Is the Entry ID array empty?
THEN
   Processing is complete;
ELSE
IF Is the LastReturnedSlot variable at the last slot?
THEN
   Set it to the first slot, since we process the array circularly;
ELSE Set LastReturnedSlot to the next slot;
Retrieve the entry-ID of the entry to process;
IF Is the entry ID array less than ⅜ full and are there still bits left in the bitmap?
THEN
   Execute the asynchronous phase to get more pages on their way into main store;

TABLE 2 Pseudo Code for the Asynchronous Processing Phase:

Using LastProbeSlot, retrieve the entry ID to use as a starting point. This was retrieved from the bitmap last time, but its storage was not scheduled for a read.;
Do Loop as long as there are resources left to build read requests. The arrays may fill up, the storage pool may fill as well. Each time through this loop another read request will be scheduled;

Calculate the starting address for the entry ID. This is the address to start the read request.;

The following code will scan the bitmap, deriving the end of the read request. It ends at the earliest of: 1.) The maximum read size supported by the storage subsystem, 2.) The physical end of a storage range, and 3.) A gap of ShortLook pages. The first two are more of a hard limit. The scheduled read will not go beyond those boundaries. The gap of ShortLook pages is more of a moving target. Each time a bit is found in the bitmap which corresponds to an Entry ID within the ShortLook distance, a New gap endpoint needs to be calculated.

Calculate the entry ID which, if scheduled for read, would give a size larger than the maximum read size. Save this in HardLimit;

IF Is HardLimit past the physical end of a storage range, or other boundary of interest? THEN Set HardLimit to be the boundary. . . ;

Down inside the next loop is a check to see if the Entry ID found by scanning the bitmap leaves too big of a gap (More than ShortLook pages). This calculation uses the previously found entry ID, and ShortLook, and will store its results is ShortLimit. To get it set up correctly for the test inside the loop, set Short-Limit to be the current Entry ID;

Remember the current entry ID as being the one that starts this IO—in StartingIO;

LOOP until we hit a spot to break this read request;

Remember the current entry ID in PreviousEntry ID;

Get a new spot to store the entry ID we get back from scanning the bitmap.

IF Is LastProbeSlot at the LastSlot in the array? THEN

Set LastProbeSlot to be the FirstSlot;

ELSE

Set LastProbeSlot to be the next Slot;

Check to see if we would be about to overfill the array.

IF LastProbeSlot=LastReturnedSlot THEN

We need to stop finding more entry IDs, and just do the read request we've built up so far.

Back LastProbeSlot to where it just was;

LEAVE the IO Building loop, remembering we left because the entry array was full;

Scan the bitmap to find the next ON bit;

IF Did scanning the bitmap run out of bits to find—there are not any more ON bits? THEN LEAVE the IO Building loop because of an empty bitmap;

Remember the Entry ID returned, using the array slot addressed by LastProbeSlot;

Does this entry ID get added to this IO, or is it time for a break?

IF Is the Entry ID greater than the HardLimit? THEN

LEAVE the IO Building loop because of read size being exceeded;

ELSE

IF Is the Entry ID greater than the ShortLimit?

(Always will be first time through the loop) THEN DO;

Using PreviousEntry ID and ShortLook, calculate a new value for ShortLimit. Each time an entry is found Within ShortLook pages, it marks a new spot for the gap to start. As such, the value needs to be recalculated each time it is exceeded.;

IF Is the Entry ID greater than the new value for ShortLimit?

THEN

LEAVE the IO Building loop because of the entries being too sparse—too large of a gap;

END;

END of the Loop which builds the IO range;

We reached an IO Boundary! Now that we've done some looking at the bitmap, it is time to bring the storage we've collected. Remember, we are not including the entry ID we just found, it is read in the next IO.

Calculate how large a chunk of storage is to be read.

IF Did processing in the IO Bundling loop hit a storage boundary?

The IO Size reaches to the end of that boundary, if Entries can wrap from the end of this storage section to the beginning of the next, this is the place to handle that situation as well;

ELSE

IF Did processing in the IO Bundling loop fill up the entry ID array?

THEN

Special processing is needed for a completely filled entry ID array. If the entry ID array is completely filled, the scanning of the bitmap has reached a dense region. Otherwise, an IO would have been broken by the sparseness criteria. It is important to stay ahead of the synchronous processing phase. If the bitmap continues to be dense, the entry-id array will continue to fill up before enough asynchronous reads have been scheduled. To offset this, set the IO Size to be the maximum read size allowed. That way, the next time the synchronous phase invokes this asynchronous phase, the needed pages will have already have been read into storage. This last sentence hints at one more consideration. The storage read last time the entry-ID array was full may have also been sufficient for this invocation. If so, do not schedule another read for the pages read last time.

IF Did the IO scheduled last time read in all the pages needed for all the entry-IDs found this time? THEN Do not schedule any more reads, and return to the synchronous phase;

ELSE

Set the IO Size to be the maximum read size;

ELSE

Calculate the storage needed to read the pages starting from StartingIO Entry ID, and getting the complete entry-ID saved in PreviousEntry ID;

Everything is calculated, tuck the information away in the Storage tracker array.

IF Is LastRead at the last slot THEN

Set it to the storage array's FirstSlot;

ELSE

Set it to the next array slot;

Save the address;

Save the IO Size;

The remaining piece of information, the entry ID when this storage is not used anymore, depends upon if we left the IO Bundling loop because of a full array.

IF Did we leave the IO Bundling loop because of a full array? THEN

Set the FreeAble Entry ID to be the next entry past the extended Read request calculated.

(StartingIO+MaxReadSize/EntryLen);

ELSE

Set the FreeAble Entry ID to be the entry ID which broke the IO;

Above it was mentioned this algorithm would address running in a constrained storage pool. If this is true, this process has its own share of the pool, and needs to track how much has been used. When a request is scheduled, the process' share is increased. When a previously needed storage request is no longer needed, the process' share is decreased. Also, some storage subsystems give the user the ability to identify main-store page frames which can be used as targets for the DASD read requests. The storage tracker array supports both of these.

Increase the process' share of the pool by the IO Size; 'Exchangeable Slot' points to a read request we did some time ago. When we did that IO, we remembered the entry ID where it was no longer needed for the synchronous phase.

IF Is the Entry ID saved in Exchangeable Slot Less than the Entry ID saved in the Entry ID array's LastReturnedSlot? THEN Issue the Read request, also giving the storage subsystem the address corresponding to the page frames available for satisfying the read request;

Decrease the process' share of the pool by the amount listed in the Exchangeable Slot;

Bump Exchangeable Slot to the next array element, wrapping as described before;

ELSE

Issue the Read request;

The point of the whole algorithm has now been performed: A read request has been issued. Can another one be issued? One thing mentioned above is if the Entry ID array fills up, an IO must be issued for whatever has been scanned thus far, regardless if a nice IO boundary has been reached. It is a good idea to try to stop a little earlier than that, if possible.

IF Is the Entry ID array at least ⅞ full? THEN

Return to the Synchronous phase;

IF Did we leave the IO Building loop because of the End of the bitmap being reached? THEN Mark the array structures such that the synchronous phase doesn't invoke this asynchronous phase again, and that when the array is empty, there are no more entries;

Return to the Synchronous phase;

Another reason to stop this phase is having consumed our share of the pool. This algorithm is on the aggressive side. It does read requests until the storage requested is above its share, one too many. If the subsystem is strict enough that the requests must stay below its share, the amount of storage left in the pool could be incorporated into the setting of HardLimit, above.

IF Is the amount of storage currently claimed more than the processes share? THEN

DO;

Before we stop for this reason, there is one more thing to check. Given the possible accordion nature of the storage requests, more slots worth of entries may have been processed than freed. Free up some of that storage, if possible, to hopefully round the loop again to get more entries paged in.

LOOP Until enough storage has been freed or found to allow another read request to be issued;
   IF Is the Entry ID saved in Exchangeable Slot Less than the Entry ID saved in the Entry ID array's LastReturnedSlot?
      THEN
         IF Would using this slot's storage free up enough for an exchange to be done?
            THEN LEAVE this inner loop to go around the main loop again;
         ELSE
           Decrease the process' share of the pool by the amount listed in the Exchangeable Slot;
           Bump Exchangeable Slot to the next array element, wrapping as described before;
      ELSE
         Return to the synchronous phase;
      END Looping to free a bit of storage;
   END;
   END Looping to build IO requests;

While the present invention has been described with reference to the details of the embodiments of the invention shown in the drawing, these details are not intended to limit the scope of the invention as claimed in the appended claims.

What is claimed is:

1. A computer implemented method for paging control using a reference structure in a computer system comprising the steps of:

scanning the reference structure to identify a next selected entry for an IO range building routine;

comparing the next selected entry with a set hardlimit value;

responsive to the next selected entry being greater than the hardlimit value, exiting the IO range building routine;

identifying a shortlimit value;

comparing the next selected entry with the identified shortlimit value;

responsive to the next selected entry being greater than the identified shortlimit value, exiting the IO range building routine; and using a first array for storing entry IDs for selected entries found from scanning the reference structure including the step of storing a last probed index addressing an array slot containing an entry ID for a most recently retrieved selected entry from the reference structure.

2. A computer implemented method for paging control as recited in claim 1 wherein the step of identifying the shortlimit value includes the step of using a last selected entry and a dynamic shortlook value to calculate the shortlimit value.

3. A computer implemented method for paging control as recited in claim 1 wherein the step of comparing the next selected entry with a set hardlimit value includes the step of comparing the hardlimit value with a physical end of a storage range or other set boundary and responsive to the hardlimit value being past the set boundary, setting the hardlimit value as the set boundary.

4. A computer implemented method for paging control as recited in claim 1 includes the steps of using a second array for tracking blocks of storage used for the selected entries found from scanning the reference structure.

5. A computer implemented method for paging control as recited in claim 1 includes the steps of storing a last returned index addressing an array slot containing an entry ID for a most recently returned selected entry.

6. A computer implemented method for paging control as recited in claim 4 wherein the step of using the second array for tracking blocks of storage used for the selected entries found from scanning the reference structure includes the steps of storing an exchangeable slot index addressing a least recently used storage block.

7. A computer implemented method for paging control as recited in claim 6 includes the steps of storing a last read slot index addressing a last read storage block.

8. A computer implemented method for paging control as recited in claim 7 wherein the steps of storing the exchangeable slot index and the last read slot index include the steps of storing an address and a size of the storage block and an entry ID used to identify where the storage block is no longer needed.

9. A computer implemented method for paging control as recited in claim 1 include the steps of tracking use of an allocated storage pool.

10. A computer implemented method for paging control as recited in claim 9 wherein the steps of tracking use of an allocated storage pool include the steps of incrementing a current use value for each asynchronous read by a corresponding storage amount and decrementing the current use value by an identified storage amount for each processing operation freeing a storage block.

11. A computer program product for use in a computer system comprising:
   a recording medium;
   means, recorded on the recording medium, for scanning the reference structure to identify a next selected entry for an IO range building routine;
   means, recorded on the recording medium, for comparing the next selected entry with a set hardlimit value;
   means, recorded on the recording medium, responsive to the next selected entry being greater than the hardlimit value, for exiting the IO range building routine;
   means, recorded on the recording medium, for identifying a shortlimit value;
   means, recorded on the recording medium, for comparing the next selected entry with the identified shortlimit value;
   means, recorded on the recording medium, responsive to the next selected entry being greater than the identified shortlimit value, for exiting the IO range building routine; and
   means, recorded on the recording medium, for using a first array for storing entry IDs for selected entries found from scanning the reference structure including means, recorded on the recording medium, for storing a last probed index addressing an array slot containing an entry ID for a most recently retrieved selected entry from the reference structure.

12. A computer program product as recited in claim 11 includes means, recorded on the recording medium, for using a second array for tracking blocks of storage used for the selected entries.

13. A computer program product as recited in claim 11 includes means, recorded on the recording medium, for tracking use of an allocated storage pool including means, recorded on the recording medium, incrementing a current use value for each asynchronous read by a corresponding storage amount and decrementing the current use value by an identified storage amount for each processing operation freeing a storage block.

14. A computer program product for paging control using a reference structure, said computer program product including a plurality of computer executable instructions stored on a computer readable medium, wherein said instructions, when executed by said computer, cause the computer to perform the steps of:
   scanning the reference structure to identify a next selected entry for an IO range building routine;
   comparing the next selected entry with a set hardlimit value;
   responsive to the next selected entry being greater than the hardlimit value, exiting the IO range building routine;
   identifying a shortlimit value;
   comparing the next selected entry with the identified shortlimit value;
   responsive to the next selected entry being greater than the identified shortlimit value, exiting the IO range building routine; and
   using a first array for storing entry IDs for selected entries found from scanning the reference structure including the step of storing a last probed index addressing an array slot containing an entry ID for a most recently retrieved selected entry from the reference structure.

15. A computer program product for paging control using a reference structure as recited in claim 14 wherein the steps of using a first array for storing entry IDs for selected entries found from scanning the reference structure further includes the steps of storing a last returned index addressing an array slot containing an entry ID for a most recently returned selected entry and using a second array for tracking blocks of storage used for the selected entries found from scanning the reference structure including the steps of storing a last read slot index addressing a last read storage block and storing an exchangeable slot index addressing a least recently used storage block.

16. A computer program product for paging control using a reference structure as recited in claim 14 wherein said instructions, when executed by said computer, further cause the computer to perform the steps incrementing a current allocated storage pool use value for each asynchronous read by a corresponding storage amount and decrementing the current allocated storage pool use value by an identified storage amount for each processing operation freeing a storage block.

17. A computer system having apparatus for paging control using a reference structure comprising:
   a processor,
   a mainstore coupled to the processor for storing data processed by the processor;
   an auxiliary memory for storing data transferred to and from the mainstore;
   means for scanning the reference structure to identify a next selected entry for an IO range building routine;
   means for comparing the next selected entry with a set hardlimit value;
   means responsive to the next selected entry being greater than the hardlimit value, for exiting the IO range building routine;
   means for identifying a shortlimit value;
   means for comparing the next selected entry with the identified shortlimit value;
   means responsive to the next selected entry being greater than the identified shortlimit value, for exiting the IO range building routine; and
   means for using a first array for storing entry IDs for selected entries found from scanning the reference structure including means for storing a last probed index addressing an array slot containing an entry ID for a most recently retrieved selected entry from the reference structure.

* * * * *